March 30, 1965 N. E. NILSSON 3,176,082
TELEPHONE RINGING SIGNAL TRANSFER DEVICE
Filed Nov. 9, 1962
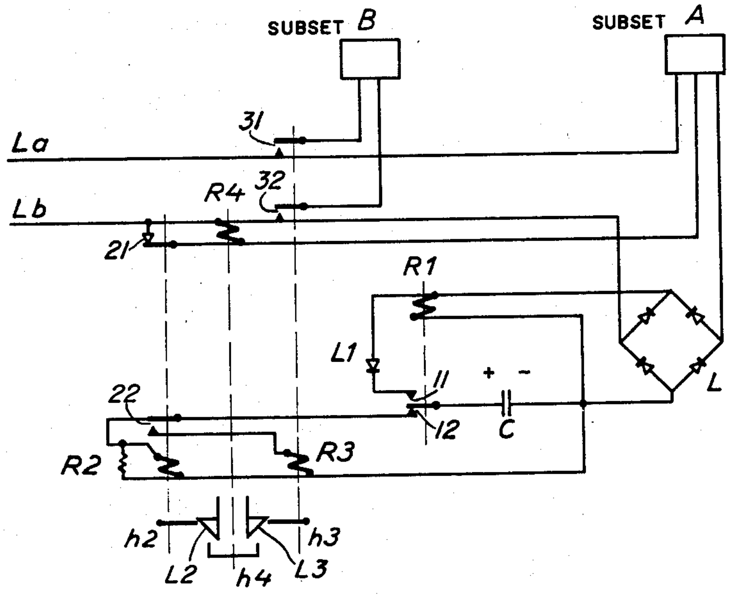
INVENTOR
NILS EMIL NILSSON
BY Hane and Nydick
ATTORNEYS 3,176,082

TELEPHONE RINGING SIGNAL TRANSFER DEVICE

Nils Emil Nilsson, Stockholm, Sweden, assignor to Telefonaktiebolaget L M Ericsson, Stockholm, Sweden, a corporation of Sweden Filed Nov. 9, 1962, Ser. No. 236,517
Claims priority, application Sweden, Dec. 12, 1961, 12,407/61
2 Claims. (Cl. 179—84)

The present invention concerns a transfer device for transferring ringing signals for use with telephone instruments. Such transfer devices are used when it is desired that a call, which is not answered after a number of ringing signals is to be transferred to another instrument.

In the known devices a relatively complicated and expensive step-by-step mechanism is usually used, which mechanism is stepped forward one step by each ringing signal. When the mechanism has been stepped forward a predetermined number of steps, contacts are closed, by means of which the telephone line is connected to the other or auxiliary instrument assigned to receive the subsequent ringing signals. The mechanism remains in the position in which the contacts are actuated until the handset of the main instrument is lifted off the hood, that is until a call is originated or answered by this instrument. When additional calls are received in the meantime the very first ringing signal will reach the auxiliary instrument. When the handset of the main instrument is removed, a releasing relay connected in series with the speech circuit of this instrument operates and causes the mechanism to return to the original position.

It is an object of the invention to provide a simplification and improvement of the known devices. Instead of the step-by-step mechanism, relays are used, which are operated by means of the discharge current of a capacitor which for each ringing signal is charged by means of rectified current taken out from the signal. The invention is principally characterized by a step-by-step device including two stepping relays, each provided with a mechanical locking device for locking the relay in the operated position. One of said stepping relays is connected in the discharge circuit of the capacitor and, when operated, connects the other stepping relay to the same circuit, and the other stepping relay, when operated, transfers the ringing signals. The releasing relay, when operated, releases the mechanical locking of the stepping relays.

The invention is further described by means of an embodiment with reference to the attached drawing, which shows a circuit diagram of the transfer device.

A telephone line L*a*,L*b* is connected to a telephone instrument or subscriber's set A. Between the branch L*b* and a contact of the instrument A for connecting an additional ringer, a rectifier bridge L is connected with a signal relay R1. The transfer device includes a capacitor C, two stepping relays R2 and R3, and a releasing relay R4. The armatures of the stepping relays are provided with mechanical locking devices each comprising a locking bar *h*2 and *h*3, respectively secured to the respective relay armature, and a resiliently mounted latch hook 12 and 13 respectively. When a stepping relay, for instance R2, is operated, the locking bar *h*2 is moved towards the relay coil—upwards in the figure—whereby the tip of the locking bar slides along the oblique surface of the latch hook 12 displacing it laterally until it snaps in below the tip of the locking bar, thus preventing the relay armature from releasing when the current through the relay winding ceases.

When the first ringing signal is received, the relay R1 operates, whereby the capacitor C is charged through a make contact 11 of said relay. When the relay releases at the end of the ringing signal, the capacitor is discharged through a back contact 12 of the relay and the coil of the stepping relay R2 which operates. In order to avoid a discharge of the capacitor through the coil of relay R1 before this relay has released at the end of the ringing signal, a recifier L1 is provided between the coil of relay R1 and the make contact 11 of said relay.

When relay R2 operates, the relay R3 is connected to the discharge circuit of the capacitor C by a contact 22. The two relays R2 and R3 and the capacitor C are so dimensioned that the part of the discharge current flowing through the coil of the relay R3 after the first release of relay R1 is insufficient to operate relay R3. Only when relay R1 releases at the end of the second ringing signal, the relay R3 operates because the discharge current of the capacitor is now divided between the two relays from the first moment of the discharge.

When relay R3 operates, an auxiliary instrument or second subscriber's set B is connected to the line through make contacts 31 and 32 of said relay, whereby subsequent ringing signals will be received by the auxilary instrument B and by the main instrument A also.

The relay R2 has a break contact 21 which in the inactive position of the relay closes a short-circuit for the coil of the release relay R4, thus preventing undesirable impedance to be connected in the speech circuit of the instrument A during conversation. When the relay R2 is operated by a ringing signal, this short-circuit is removed so that the relay R4 will operate when the handset of the main instrument A is lifted. When the relay R4 operates, the armature *h*4 of this relay displaces the latch hooks of the relays R2 and R3 so that the locking bars and armatures of said relays are freed, and the relays R2 and R3 release. When relay R2 closes its break contact 21, the relay R4 is again short-circuited and releases.

I claim:

1. In a telephone installation including a first subscriber's set connected to a line and a second subscriber's set connected to said line, a device for transferring ringing signals received on said line to said second subscriber's set, said device comprising a rectifier bridge circuit connected to the line for rectifying ringing signal alternating current, a relay having a make contact and a back contact connected with its coil to direct current terminals of said rectifier bridge circuit, a capacitor connectable by the make contact of said relay when the latter is operated to said direct current terminals to charge the capacitor, circuit means for connecting said capacitor to the back contact of said relay when the latter is not operated, a first and a second stepping relay, each of said stepping relays including releasable latch means which automatically retain the respective relay armature in the operated position thereof when the respective stepping relay is operated, the coil of the first stepping relay being connected to said back contact to form a discharge circuit for said capacitor, said first stepping relay being operated by a discharge of current by said capacitor and when operated connecting said second stepping relay to the discharge circuit of said capacitor, the second stepping relay being also operated by a discharge of current of said capacitor and when operated connecting said second subscriber's set to the line, and a release relay connected in series with said first subscriber's set, said release relay including means mechanically releasing said latch means of said first and second stepping relays when the release relay is operated.

2. A telephone installation according to claim 1 and comprising means for operating said release relay, said means including circuit means connecting said release relay in an energizing circuit with said rectifier bridge circuit, and normally closed switch contact means short-circuiting said energizing circuit, said switch means being opened by the operation of said first stepping relay thereby causing operation of said release relay.

References Cited in the file of this patent

UNITED STATES PATENTS

| | | |
|---|---|---|
| 2,718,560 | Alexandersson | Sept. 20, 1955 |

FOREIGN PATENTS

| | | |
|---|---|---|
| 102,178 | Sweden | July 29, 1941 |
| 633,520 | Great Britain | Dec. 19, 1949 |